US012756698B2

(12) United States Patent
Pontual et al.

(10) Patent No.: US 12,756,698 B2
(45) Date of Patent: *Oct. 6, 2026

(54) NETWORK MANAGEMENT SERVICE FOR A RESTRICTED REGION

(71) Applicant: Oracle International Corporation, Redwood Shores, CA (US)

(72) Inventors: Murillo Pontual, San Mateo, CA (US); Matthew Harris Barr, Seattle, WA (US); Christian Augustine Csar, Seattle, WA (US); Maheswaran Thiagarajan, Seattle, WA (US); Esha Tebine Oyarijivbie, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/775,571

(22) Filed: Jul. 17, 2024

(65) Prior Publication Data

US 2024/0372847 A1 Nov. 7, 2024

Related U.S. Application Data

(63) Continuation of application No. 17/686,332, filed on Mar. 3, 2022, now Pat. No. 12,126,608.

(51) Int. Cl.
*H04L 9/40* (2022.01)

(52) U.S. Cl.
CPC ................................ *H04L 63/0807* (2013.01)

(58) Field of Classification Search
CPC .................................................. H04L 63/0807
See application file for complete search history.

(56) References Cited

U.S. PATENT DOCUMENTS 8,640,189 B1 1/2014 Ernst et al.
11,025,707 B1 * 6/2021 Luker ................ H04L 67/1004
(Continued)

FOREIGN PATENT DOCUMENTS

CN 102646077 B 6/2016
CN 109255231 A 1/2019
(Continued)

OTHER PUBLICATIONS

International Application No. PCT/US2024/029088, "International Search Report and Written Opinion", mailed Aug. 16, 2024, 15 pages.

(Continued)

*Primary Examiner* — Yonas A Bayou
(74) *Attorney, Agent, or Firm* — Kilpatrick Townsend & Stockton LLP

(57) ABSTRACT

A computing device may receive a request to provide a deployment bundle to a restricted network. The deployment bundle can include information identifying a plurality of changes to be made to the restricted network. The request can include at least one of a change management ticket, a network identifier or a file identifier. The computing device may access a ticket tracking system to authenticate the change management ticket, the change management ticket indicating whether the plurality of changes are authorized. The computing device may access a source control management service to determine, based at least in part on the network identifier or the file identifier, if the deployment bundle is authorized to access the restricted network. The computing device may provide the deployment bundle to a restricted region computing device configured to apply the deployment bundle to the restricted region. Numerous other aspects are described.

20 Claims, 11 Drawing Sheets

(56) References Cited

U.S. PATENT DOCUMENTS

| | | | | |
|---|---|---|---|---|
| 2011/0211520 | A1* | 9/2011 | Gerstenberger | H04L 27/3405 370/312 |
| 2013/0067558 | A1 | 3/2013 | Markham et al. | |
| 2013/0212698 | A1 | 8/2013 | Tarrago et al. | |
| 2016/0274896 | A1* | 9/2016 | Bowen | G06F 9/45558 |
| 2016/0352769 | A1 | 12/2016 | Bryant et al. | |
| 2019/0386957 | A1 | 12/2019 | Leon | |
| 2020/0012492 | A1* | 1/2020 | Bonar | G06F 8/65 |
| 2021/0211520 | A1* | 7/2021 | Ritter | H04L 67/1097 |
| 2021/0289024 | A1* | 9/2021 | Luker | H04L 41/5019 |
| 2022/0109560 | A1 | 4/2022 | Dennison et al. | |
| 2022/0159064 | A1 | 5/2022 | Barton et al. | |
| 2023/0259574 | A1* | 8/2023 | Kohl | G06F 16/9535 715/234 |

FOREIGN PATENT DOCUMENTS

| | | | |
|---|---|---|---|
| CN | 109977039 | B | 2/2021 |
| EP | 2710507 | A1 | 3/2014 |

OTHER PUBLICATIONS

"Configuring External Key Management", Available Online at: https://docs.netapp.com/ontap-9/index.jsp?topic=%2Fcom.netapp.doc.pow-nve%2FGUID-DD718B42-038D-4009-84FF-20BBD6530BC2.html, Accessed from Internet on Sep. 2, 2021, pp. 1-2.

"Disk Encryption and Key Management with Vault Enterprise", Available Online at: https://www.datocms-assets.com/2885/1595526264-disk-encryption-and-key-management-with-vault-brief.pdf, Aug. 12, 2020, 2 pages.

"Encryption at Rest", Security Guide—Chapter 14, Available Online at: https://docs.marklogic.com/guide/security/encryption, Accessed from Internet on Sep. 2, 2021, pp. 1-28.

"How Amazon EMR Uses Aws Kms", Available Online at: https://docs.aws.amazon.com/kms/latest/developerguide/services-emr.html, Accessed from Internet on Sep. 2, 2021, pp. 1-5.

"Moving Encryption Keys to External Storage", Available Online at: https://www.jetico.com/file-downloads/web_help/bcve4/html/04_usage/01_volume_encryption/05_moving_keys.htm, Accessed from Internet on Aug. 31, 2021, pp. 1-3.

"Storage Management", IBM, Available Online at: https://www.ibm.com/docs/de/spp/10.1.7?topic=reference-storage-management, Accessed from Internet on Aug. 31, 2021, pp. 1-6.

U.S. Appl. No. 17/686,332, "Notice of Allowance", mailed Jun. 26, 2024, 11 pages.

Arora, "HashiCorp Vault as an External Key Manager for NetApp Encryption", Available Online at: https://medium.com/hashicorp-engineering/hashicorp-vault-as-an-external-key-manager-for-netapp-encryption-7794297f6df1, Mar. 5, 2020, pp. 1-7.

Lanfear, "Azure Disk Encryption for Windows and Linux IaaS VMs", Available Online at: https://github.com/uglide/azure-content/blob/master/articles/azure-security-disk-encryption.md, Accessed from Internet on Aug. 31, 2021, pp. 1-31.

Shinder et al., "Secure Client Deployment with Trusted Boot and BitLocker", Available Online at: https://www.sciencedirect.com/science/article/pii/B9781597499804000091, 2013, pp. 239-265.

* cited by examiner

NETWORK MANAGEMENT SERVICE FOR A RESTRICTED REGION

CROSS-REFERENCE TO RELATED APPLICATIONS

This continuation application claims the benefit and priority of U.S. application Ser. No. 17/686,332, filed Mar. 3, 2022, entitled "NETWORK MANAGEMENT SERVICE FOR A RESTRICTED REGION," the entire contents of which is incorporated herein by reference for all purposes.

BACKGROUND

Updates to a restricted region can introduce unintended security vulnerabilities to the network. Vetting changes to the restricted region can mitigate the possibility that the network's integrity is threatened. However, conventional techniques for vetting changes to restricted regions can cause deployment bottlenecks. Accordingly, techniques for efficiently assessing the impact of changes to a restricted region are desirable.

BRIEF SUMMARY

Some aspects described herein provide a computer-implemented method. The method may include receiving a request to provide a deployment bundle to a restricted network. The request can be received at a computing device. The deployment bundle can include information that identifies a plurality of changes to be made to the restricted network. The request can include at least one of a change management ticket, a network identifier or a file identifier. The method may include accessing a ticket tracking system with the computing device to authenticate the change management ticket. The change management ticket can indicate whether the plurality of changes are authorized. The method may include accessing a source control management service with a computing device to determine if the deployment bundle is authorized to access the restricted network. Determining if the deployment bundle is authorized can be based at least in part on the network identifier and the file identifier. The method may include providing the deployment bundle to a restricted region computing device using the computing device. The restricted region computing device can be configured to apply the deployment bundle to the restricted region.

One aspect includes authenticating the change management ticket is based at least in part on determining if a security impact analysis for the plurality of changes has been performed.

One aspect includes creating a security impact analysis request in response to a determination that the security impact analysis has not been performed for the plurality of changes. The security impact analysis can be created by the computing device One aspect includes providing the deployment bundle to the restricted network via a unidirectional gateway.

One aspect includes a restricted network that is configured to only receive traffic.

One aspect includes a method where authenticating the change management ticket includes creating a change management ticket in response to a determination that the change management ticket does not exist.

One aspect includes a method where authenticating the change management ticket includes determining whether the request was created by a user with department of defense (DoD) impact level 5 (IL5) authorization.

Some aspects described herein provide a non-transitory computer-readable medium that stores a set of computer executable instructions. The set of instructions can cause one or more processors of the computing device to receive a request to provide a deployment bundle to a restricted network. The deployment bundle can include information that identifies a plurality of changes to be made to the restricted network. The request can include at least one of a change management ticket, a network identifier or a file identifier. The instructions may cause the computing device to access a ticket tracking system to authenticate the change management ticket. The change management ticket can indicate whether the plurality of changes are authorized. Instructions may cause the computing device to access a source control management service to determine if the deployment bundle is authorized to access the restricted network. Determining if the deployment bundle is authorized can be based at least in part on the network identifier and the file identifier. The instructions may cause the computing device to provide the deployment bundle to a restricted region computing device. The restricted region computing device can be configured to apply the deployment bundle to the restricted region.

Some aspects described herein provide a computing device, comprising: one or more memories, and one or more processors, communicatively coupled to the one or more memories, configured to receive a request to provide a deployment bundle to a restricted network. The deployment bundle can include information that identifies a plurality of changes to be made to the restricted network. The request can include at least one of a change management ticket, a network identifier or a file identifier. The computing device may access a ticket tracking system to authenticate the change management ticket. The change management ticket can indicate whether the plurality of changes are authorized. The computing device can access a source control management service to determine if the deployment bundle is authorized to access the restricted network. Determining if the deployment bundle is authorized can be based at least in part on the network identifier and the file identifier. The computing device can provide the deployment bundle to a restricted region computing device using the computing device. The restricted region computing device can be configured to apply the deployment bundle to the restricted region.

DETAILED DESCRIPTION

Figure 1:
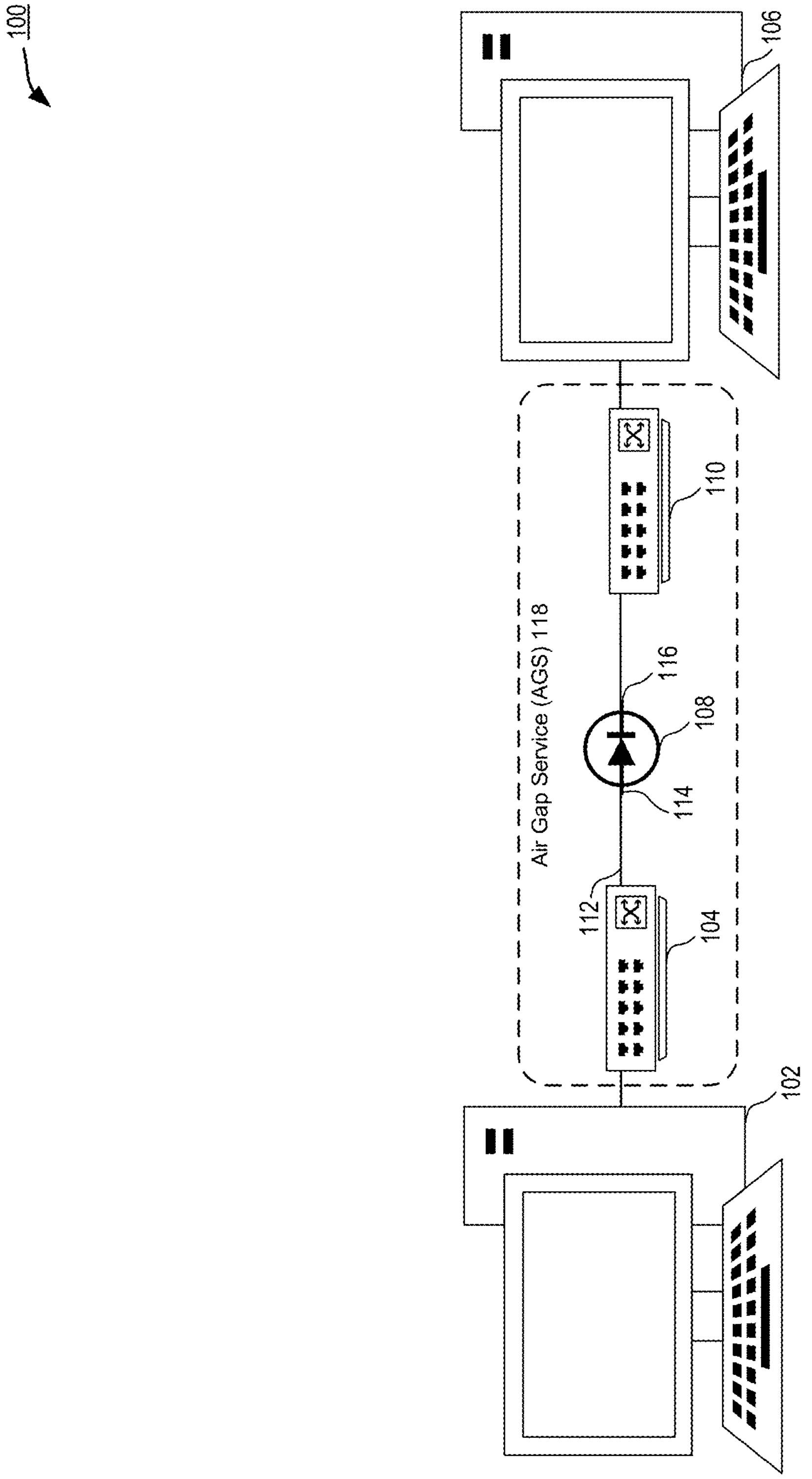
FIG. 1 shows a simplified diagram of a hardware implemented restricted region according to an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques for controlling access to a restricted region are disclosed herein. A restricted region, or high-side, can be a network where the flow of data or user access is subject to one or more security protocols. Data flowing from a unrestricted or less restricted region, also known as a low-side, can be controlled to protect the high-side from unauthorized access or changes that can expose the high-side to security threats. The high-side can be insulated from the low-side by a unidirectional gateway that allows data to enter the restricted network but prevents communication from the high-side to the low-side.

Unidirectional communication can be enforced with hardware such as a data diode that physically permits data to travel in one direction. Changes can be moved from the low side to the high side by a Cloud Infrastructure Orchestration Service (CIOS). A CIOS can be a service for orchestrating regional deployments using a declarative infrastructure provisioner. In some circumstances, the high-side network can be entirely disconnected, or air gapped, from the low-side. In an air gapped network, data can be sent to the high-side by moving physical storage media across the air gap from the low side to the high side. Physical storage media can include a hard disk drive (HDD), solid state drive (SSD), etc.

A high-side network can be created from a low side network by the CIOS while the high-side is operating in a connected mode. The network can be created or configured in a connected mode, when the network can send and receive communication from other networks, and the connected mode network can be isolated to create a disconnected network. Before disconnection, the initial steps for creating a disconnected network can be similar to the steps for creating a connected network.

To create a network in connected mode, the CIOS can instruct a change push service to push an artifact to a deployment destination. The change push service can initiate communication with a deployment destination from a central server. After the change push service delivers the artifact to in-network storage at the deployment destination, the NMS can instruct a local instance of the Cloud Infrastructure Orchestration Service to begin deployment. The local Cloud Infrastructure Orchestration Service can be located in the new disconnected network at the deployment destination. The local Cloud Infrastructure Orchestration Service can communicate with the deployment control plane at the deployment destination to create the new network.

Changes to a disconnected network can expose the high side to security vulnerabilities. A systematic approach to approving changes to a high side network can improve network security. The systematic approach can be implemented using a CIOS. Under a systematic approach, a change can be subject to increased scrutiny if the change is a security relevant change. A security relevant change can be a change to a system's configuration, environment, information, content, functionality, or users which has the potential to change the risk imposed upon the system's continued operations. Anti-virus updates, intrusion detection service (IDS) updates, or software patches may not be considered security relevant changes.

Security relevant changes can include: changes to encryption or decryption mechanisms (e.g., changes to encryption/decryption methods, key lengths, ciphers, etc.); high side network authentication changes; high side authorization changes; configuration or coding changes that can affect the system's availability; changes to checksum computation; changes to how the integrity of files are maintained, checked, computed, etc.; changes to the storage, generation, manipulation, or rotation of passwords, secrets, certificates, or keys; changes to system or security configuration; changes to how applications perform input validation or encoding; changes to how random numbers are generated or used; firewall changes; open ports configuration; changes to security policies; changes in an antivirus or an intrusion detection system (IDS) potentially excluding updates of virus definitions or rule packs; adding or removing third party software, third party components, or third party libraries; changes to scanning configurations; or new software functionalities.

Network deployments can be divided into three network deployment cases based on the network's age and whether the deployment includes security relevant changes. Case I can include deploying a new network. Case II can include deploying security relevant changes to an existing network, and case III can include deploying non-security relevant changes to an existing network. Case I and II may need to receive security authorization before the new network or changes can be deployed. Case III may be able to deploy without new security authorization because the changes are non-security relevant and the changes have already been deployed.

Differentiating between case II and case III scenarios can improve security and deployment efficiency. New security risks may be unintentionally introduced into a high side network if a case II deployment scenario is categorized as a case III deployment. However, if a case III deployment is categorized as a case II deployment, then a bottleneck may be created where common non-security relevant changes are delayed until approval. A system for verifying network deployment cases can improve security and reduce potential bottlenecks.

Whether a network deployment contains security relevant changes can be determined though a type of security authorization called a security impact analysis, and the security impact analysis can be used to differentiate between case II and case III scenarios. A security impact analysis can be include a review of the proposed changes where an reviewer answers one or more questions about the deployment. The changes may be subject to further scrutiny by a change control board (CCB) who can approve or deny the proposed changes. The security impact analysis can include someone working in the high side network, known as a high side operator, who can review the proposed changes and approve or deny the deployment. The likelihood that a network deployment can cause unintended security relevant changes can be reduced by the security impact analysis' multiple independent rounds of scrutiny.

The CIOS can use change management tickets, as part of a ticket tracking system, to indicate if a security impact analysis has been performed. A change management ticket can be generated for a new deployment and the ticket can be stored in the ticket tracking system. In response to a network deployment for a restricted network, the CIOS can check the ticket tracking system to determine that a security impact analysis has been performed for the deployment. The CIOS can prevent a deployment unless a change management ticket associated with the network deployment indicates that a security impact analysis has been performed.

Network deployments can be provided to the CIOS as deployment bundles. A deployment bundle can be one or more services, microservices, software applications, etc. that are deployed simultaneously to a network as a cohesive whole. A deployment bundle can be a unit of work that can be defined by the development team and the size of a deployment bundle can vary between teams or between deployments. The deployment bundle can be linked to a change management ticket and an authorization file by a bundle identifier (ID). A bundle ID can be a set of configuration files for provisioning and deploying a service in a new region using a declarative infrastructure provisioner. The authorization file can be a text file indicating the network regions where the bundle can be deployed. Authorization files can be indexed by bundle ID in a source control management service database.

In an illustrative example, a target restricted network containing confidential government records can be connected to a low side network by a unidirectional gateway. The unidirectional gateway permits data to flow from the low side into the target restricted network but the gateway does not allow data to leave the target restricted network. The network administrator for the target restricted network would like to change the antivirus configuration to improve security. The administrator can change the configurations by applying a deployment bundle to the target restricted network. Changing antivirus configurations can be a security relevant change and, as the target restricted network is an existing network, the proposed changes may be a class II deployment that require authorization.

The administrator can provide a new deployment bundle containing the proposed changes to the CIOS, and, in response to the new bundle, the CIOS can send a deployment request, the deployment bundle, and a bundle ID to the CCB. The deployment bundle can contain one or more changes to the target restricted network, and the deployment request can identify the target restricted network. The CCB can review the deployment bundle to determine if the bundle can be deployed to the target restricted network identified in the deployment request. A member of the CCB can add an authorization file, indicating whether the new bundle is authorized for the target restricted network, to a source control management service database.

In response to receiving the new bundle, the CIOS can generate a change management ticket. A reviewer, in this case an engineer from outside the deployment team, can receive the ticket and the engineer can answer questions about the deployment bundle. The engineer determines that the proposed changes are security relevant changes, and the engineer determines that the security relevant changes should be approved. As the target restricted network is an existing network, the engineer determines that the deployment bundle is a case II deployment. The engineer's determination can be reviewed by the CCB who concur with her conclusions. The change management ticket can then be sent to a high side operator for additional approval. Once all parties approve of the changes, the change management ticket can be updated to show that the bundle is approved for deployment, and the updated ticket can be stored in the ticket tracking system.

After approval, the administrator decides to use the CIOS to push the deployment bundle to the target restricted network. The CIOS can verify that the administrator has clearance to access the high side network. Verifying the clearance can include determining that the administrator is a United States (US) citizen or green card holder who is accessing the CIOS from US territory (e.g., Department of Defense (DoD) Impact Level (IL) 5 approved person). The CIOS can check the change management ticket in the ticket tracking system to determine that a security impact analysis has been performed. After checking authorization file in the source control management system database to verify that the deployment bundle is authorized for deployment to the region, the CIOS can push the deployment bundle to the target restricted region. Once the deployment bundle has been pushed to the target restricted region, a high side operator can review and deploy the bundle.

FIG. 1 shows a simplified diagram 100 of a hardware implemented restricted region according to an embodiment. A restricted region can be a computer network that is physically isolated from other networks by removing physical and wireless network connections. Data is moved between these air-gapped networks using physical storage media such as thumb drives. While these networks are secure, transferring data with thumb drives is cumbersome. Other disconnected networks use data diodes that permit one-way traffic into the disconnected network, while preventing the broadcast of sensitive information from the disconnected network.

Simplified diagram 100 shows a low side computing device connected to a router A 104 according to some embodiments. Low side computing device 102 can be a personal computer, a server computer, a virtual machine, a tablet device, a mobile phone, or any other computer device. Low side computing device 104 can be physically connected to router A 104, for example, by a network cable or low side computing device 104 can be connected to router A 104 wirelessly (e.g., WiFi). In some implementations, low side computing device 102 can be connected to the internet or a private network through router A 104, and low side computing device can be part of a low side network.

Low side computing device 102 can be connected to high side computing device 106 through communication between router A 104 and router B 110 within the air gap service (AGS) 118. A network cable 112 containing a data diode 108 can connect router A 104 and router B 110. Hardware data diodes can enforce the one way direction by physical means, e.g. an optical link comprising of optical sender, often a laser or light emitting diode (LED) and a receiver, a photo sensitive semiconductor such as a photoelectric transistor 108. Other one way systems can be utilized to implement the functionality of a one way transfer device in AGS 118. Messages received at a first terminal 114 of data diode 108 can be passed to the diode's second terminal 116, but a message cannot be sent from the second terminal 116 to the first terminal 114.

In some implementations, the high side region exists behind the second terminal 116 of the data diode 108. Messages can be sent across data diode 108 into the high side region. However, messages cannot leave the high side region via the data diode. In these implementations, router B 110 and high side computing device 106 are isolated from outside networks, but high side computing device 106 can still be connected to other devices inside the high side region through router B 110. For example, high side computing device could be part of a network containing confidential information where the ability to send information outside of the network could pose a security threat.

Figure 2:
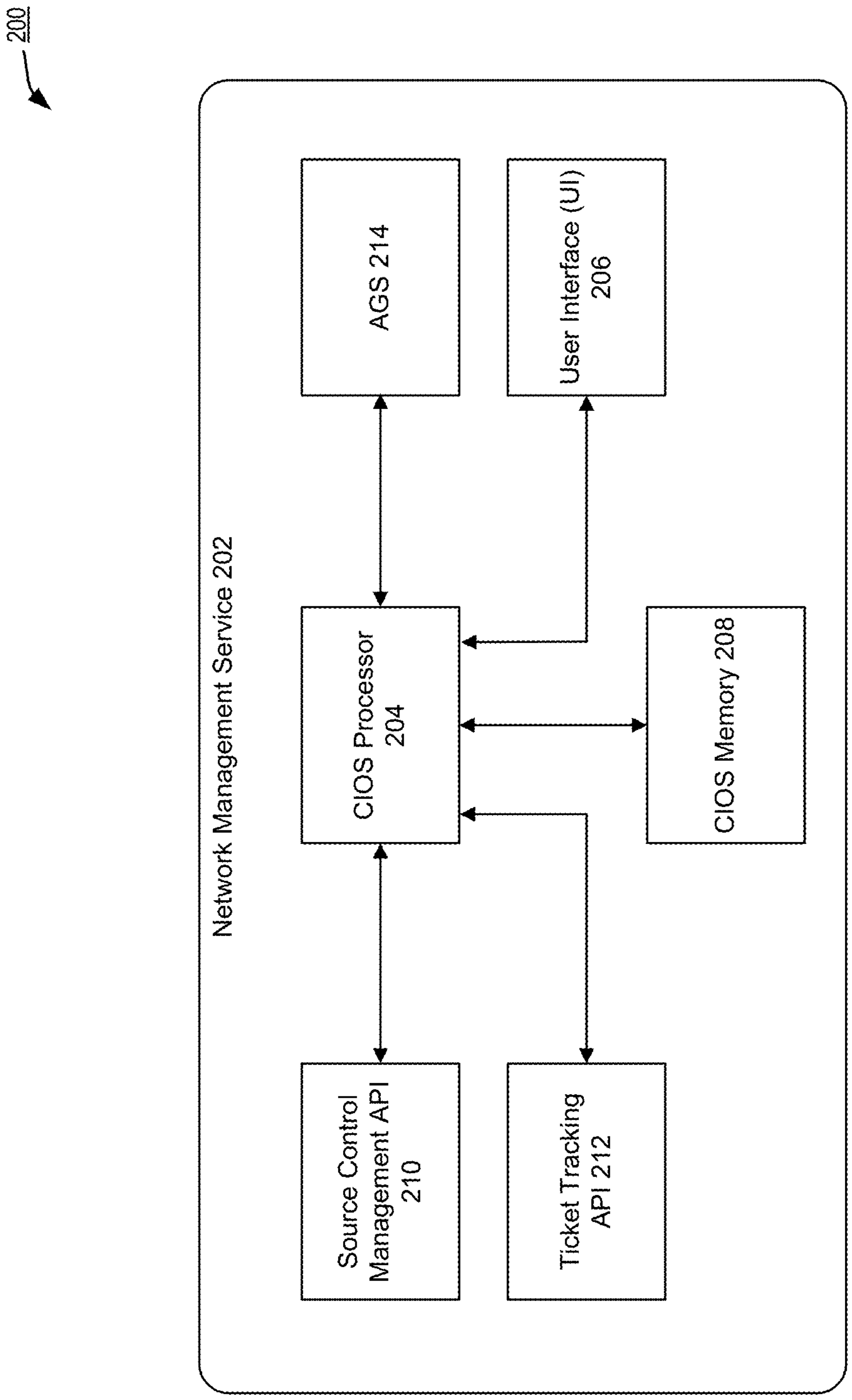
FIG. 2 is a simplified high level system diagram for a Cloud Infrastructure Orchestration Service (CIOS) according to an embodiment.

FIG. 2 is a simplified high level system diagram 200 for a Cloud Infrastructure Orchestration Service (CIOS) according to an embodiment. The CIOS 202 can contain a CIOS processor 204 that can execute software to implement the CIOS 202. The CIOS processor 204 can be one or more chips with one or more cores located on one or more computing devices. CIOS 202 can receive a request to provide a deployment bundle to a restricted region (e.g., deployment request) via the user interface (UI) 206. The received deployment request can be stored in the CIOS memory 208 by the CIOS processor 204. CIOS memory 208 can be cache memory or a central database for CIOS 202.

CIOS 202, through CIOS processor 204, can communicate with a source control management service via source control management API 210. Authorization files can be retrieved from the source control management service via source control management API 210. A bundle ID associated with the deployment request can be used to retrieve the authorization file. Source control API 210 can be used to poll the source control management system at regular intervals. If a new authorization file is found during one of the polls, CIOS processor can retrieve the authorization file via source control API 210, verify the authorization file's authenticity, and update a bundle ID approval list in CIOS memory 208. Requests for the source control management service to generate a new authorization file for a given deployment bundle can be sent from CIOS 202 to the source control management system via source control management API 210. A request to generate a new authorization file can be created in response to a failed attempt to retrieve an authorization file from the source control management service or in response to receiving a new deployment bundle.

CIOS 202 can communicate with a ticket tracking system via ticket tracking API 212. CIOS 202 can communicate with ticket tracking API 212 using CIOS processor 204. Change management tickets can be retrieved from the ticket tracking system using ticket tracking API 212. Requests for the ticket tracking service to generate a new change management ticket can also be sent from CIOS 202 via ticket tracking API 212. A request to generate a change management ticket can be sent in response to receiving a new deployment bundle. A request to generate a change management ticket can be generated in response to a failed attempt to retrieve a change management ticket from the ticket tracking system. The requests can include a bundle ID associated with the deployment bundle or the change management ticket.

CIOS 202 can receive a deployment bundle from UI 206, and processor 204 can store the received deployment bundle in CIOS memory 208. CIOS processor can store the retrieved deployment bundle in CIOS memory 208. CIOS processor 204 can retrieve a deployment bundle in response to a request received via UI 206. CIOS 202 can provide the deployment bundle, change management ticket, authorization file, or bundle ID to a restricted network via the air gap service (AGS) 214.

Figure 3:
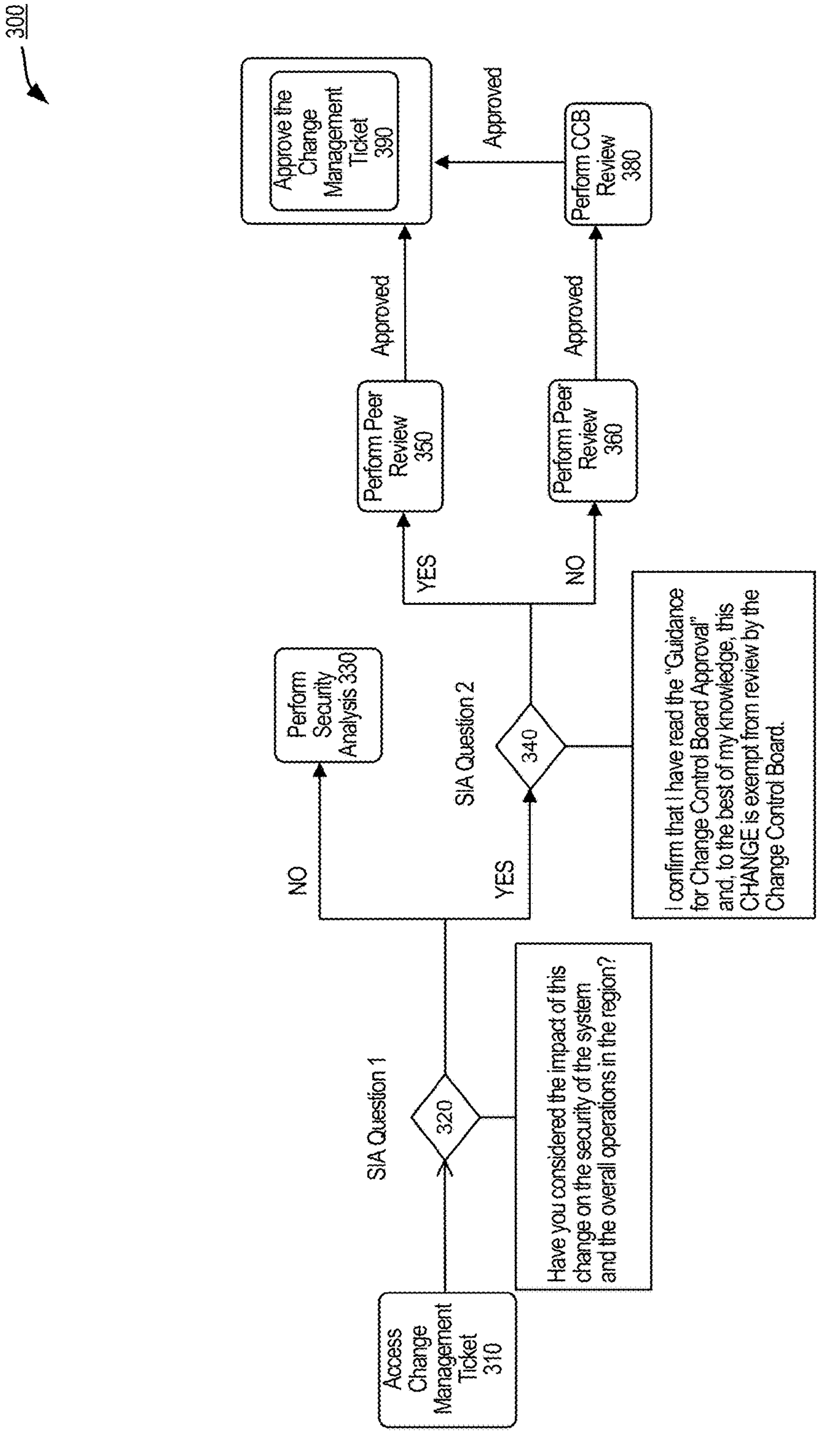
FIG. 3 is a process for performing a security impact analysis (SIA) according to an embodiment.

FIG. 3 is a process 300 for performing a security impact analysis (SIA) according to an embodiment. This process, in addition to the process from FIG. 4 and the process from FIG. 5, are illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 310, a change management ticket can be accessed. The change management ticket can be accessed from a ticket tracking system, and the ticket tracking system can be accessed via ticket tracking API 212. CIOS 202 may periodically retrieve and store (e.g., in CIOS memory 208) new change management tickets from the ticket tracking system, and the change management ticket may be accessed from CIOS memory 208. The change management ticket can be accessed by a reviewer using UI 206.

The change management ticket may be accessed using a bundle ID, and the change management ticket may be associated with a deployment bundle. The ticket tracking system may push the change management ticket to CIOS 202, or the reviewer may retrieve the change management ticket by sending a request to the ticket tracking system via ticket tracking API 212. The accessed change management ticket can be stored in CIOS memory 208. The reviewer may be a government approved person. The reviewer may be a United States citizen or green card holder accessing the low side computing device from United States territory (e.g., IL5 approved person).

At decision block 320, CIOS can receive an answer to security impact analysis (SIA) question 1. SIA question 1 can be a question about a deployment bundle associated with the change management ticket. The reviewer can be asked, via UI 206, to answer whether a security impact analysis has been performed. For instance, the reviewer can be asked to answer the following question: "Have you considered the impact of this change on the security of the system and the overall operations in the region?" The reviewer can be asked to answer a different question or other questions about the deployment bundle. The reviewer's answer can be provided via UI 206. An answer provided by the user can be stored in CIOS memory 208.

At block 330, if the answer to SIA question 1 is no, the reviewer can be prompted to perform a security impact analysis for the deployment bundle. CIOS can prompt the reviewer to perform a SIA via UI 206. Performing a security impact analysis can include asking the reviewer to consider the impact of the deployment bundle on the network where the bundle is being deployed. The analysis can also include asking the reviewer to consider the impact of the deployment bundle on the security of other networks in the region.

At decision block 340, if the answer to SIA question 1 is yes or a security impact analysis has been performed at block 330, the CIOS can receive an answer to a second security impact analysis question (SIA question 2). The reviewer can be prompted to answer the question via UI 206. The reviewer can provide a response to SIA question 2 via UI 206, and the reviewer's answer can be stored in CIOS memory 208.

The reviewer can be asked if the deployment bundle associated with the change management ticket is exempt from change control board (CCB) review. For instance, the reviewer can be asked to respond to the following prompt: "I confirm that I have read the 'Guidance for Change Control Board Approval' and, to the best of my knowledge, this change is exempt from review by the CCB." The reviewer can be asked to answer additional questions or different questions. A change may be exempt if the change does not introduce security relevant changes. Changes that are exempt can include patches, minor feature changes, minor refactoring, intrusion detection system (IDS)/antivirus updates, password/credential rotation, password/credential removal, or the creation/deletion of transient tenancies when the tenancies are used to perform general service testing.

At block 350, if the answer to SIA question 2 is yes, CIOS may initiate a peer review. CIOS 202 may initiate a peer review by sending a prompt to a peer reviewer via UI 206. CIOS may also initiate a peer review by flagging the change management ticket in the ticket tracking system via ticket tracking API 212. The ticket tracking system may send an alert to one or more eligible peer reviewers in response to the flagged change management ticket.

The peer review can include an additional person (e.g., peer reviewer), who may not be the reviewer, answering SIA question 1 and SIA question 2. The peer reviewer may be asked to answer a different number of questions, a different set of questions, or additional questions. The peer reviewer may be a government approved person. The peer reviewer may be a United States citizen or green card holder accessing a computing device from United States territory (e.g., IL5 approved person). The peer reviewer may also be a high side operator.

At block 360, if the answer to SIA question 2 is no, CIOS may initiate a peer review. The peer review can be similar to the peer review described above with reference to block 350. At block 380, if the answer to SIA question 2 is no, CIOS 202 may initiate a CCB review. The CCB review can include the CCB answering SIA question 1. CIOS 202 may initiate the peer review by sending a request for a review to one or more CCB members via UI 206. The CCB review can be initiated by CIOS 202 changing updating a CCB review flag in the change management ticket. The flag can be updated in the ticket tracking system via ticket tracking API 212. The CCB review can also include more questions or alternative questions. At block 390, the CIOS can approve the change management ticket. The CIOS can approve the change management ticket by changing the ticket status to approved via ticket tracking API 212.

Figure 4:
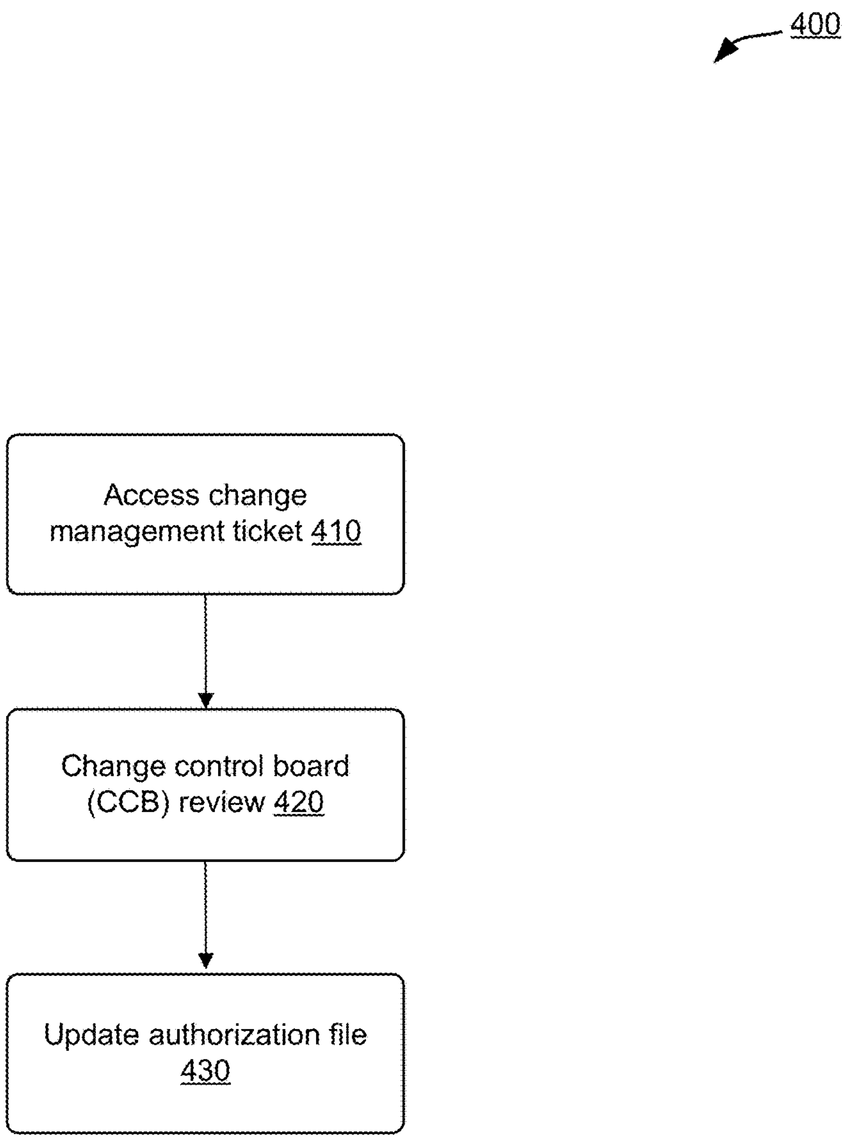
FIG. 4 is a process for updating an authorization file according to an embodiment.
Figure 5:
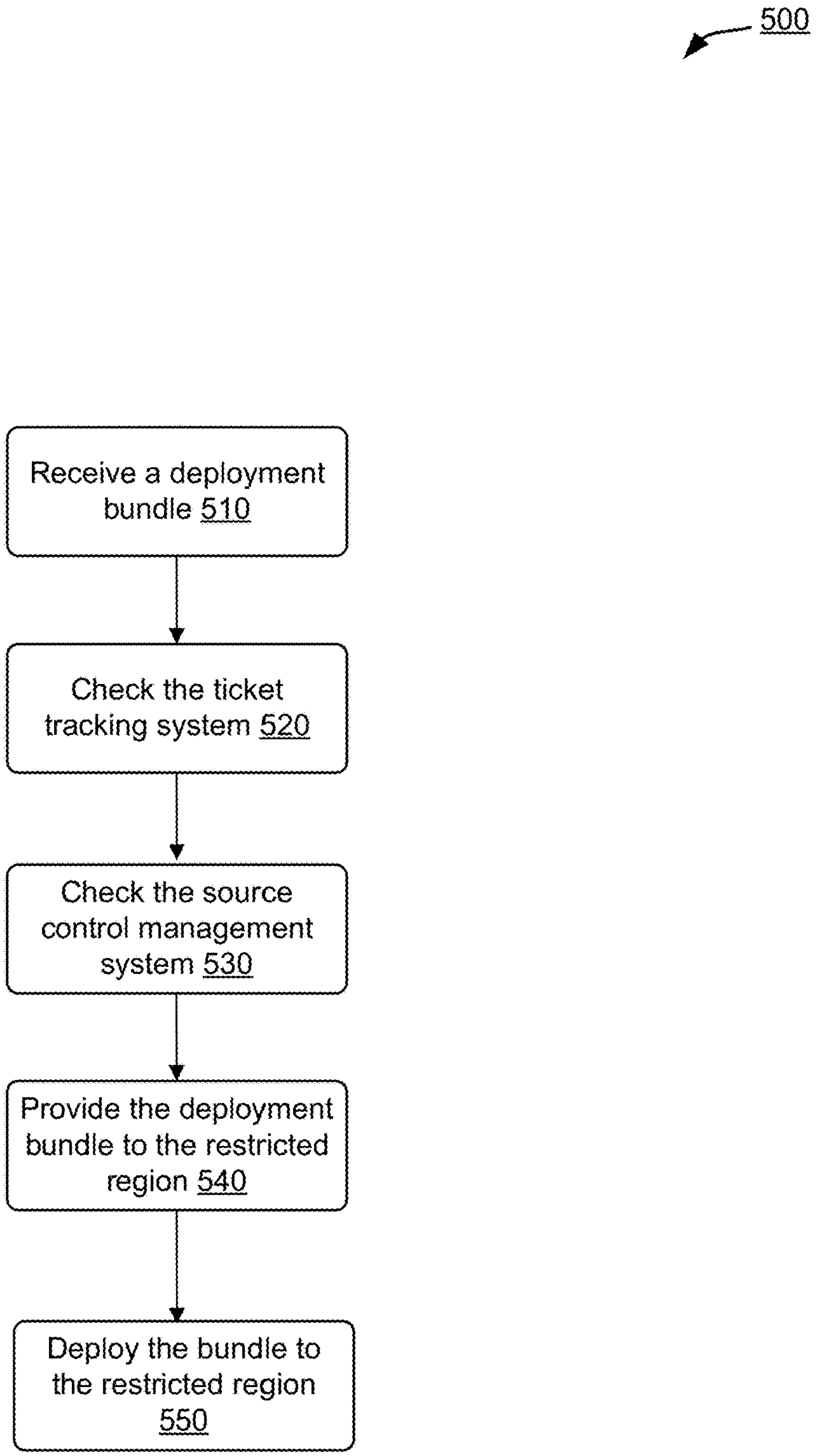
FIG. 5 is a flow diagram of a process for controlling access to a restricted region according to an embodiment.

FIG. 4 is a process 400 for updating an authorization file according to an embodiment.

At block 410, a change management ticket can be accessed. The change management ticket can be accessed by CIOS 202 via ticket tracking API 212. CIOS 202 may periodically retrieve change management tickets via ticket tracking API 212, and the retrieved tickets can be stored in CIOS memory 208. The change management ticket can be accessed from CIOS memory 208 if the change management ticket has been retrieved. The change management ticket can also be provided by a user via UI 206.

At block 420, the change control board (CCB) can be prompted to review the change management ticket. CIOS 202 may periodically access the ticket tracking system (via ticket tracking API 212) to identify new change management tickets. CIOS 202 can compare a list of change management tickets in the ticket tracking service to a local change management ticket list stored in CIOS memory 208. In response to identifying a new change management ticket, CIOS 202 can send a request for a CCB review to the CCB via UI 206.

The change management ticket can identify a service team. The service team can be one or more individuals, teams, departments, etc. that created the deployment bundle associated with the change management ticket. At least one target network for the change management ticket can be identified, and the change management ticket can be associated with a deployment bundle. The change management ticket can be associated with a deployment bundle by a bundle ID. The deployment bundle can identify a target network for the bundle, or service team (e.g., the one or more individuals, teams, departments, etc. that created the deployment bundle). The CCB can review the change management ticket based at least in part on the target network, the deployment bundle contents, or the service team. The CCB can verify that the service team is authorized to deploy the deployment bundle contents to the target network.

At block 430, the authorization file can be updated. The CCB can update the authorization file based at least in part on the CCB review. A CCB member can access the source control management service to update the authorization file via UI 206 and source control management API 210. The authorization file can be updated to identify one or more target networks where the deployment bundle associated with the authorization file is authorized for deployment.

FIG. 5 is a flow diagram of a process 500 for controlling access to a restricted region according to an embodiment.

Turning to process 500 in greater detail, at block 510, a deployment bundle can be received. The deployment bundle can be received at CIOS 202, and the deployment bundle can be received via UI 206. The deployment bundle can be received with a bundle ID. The deployment bundle can be stored in CIOS memory 208.

At block 520, the ticket tracking system can be checked. The ticket tracking system can be checked for a change management ticket, and the change management ticket can be located using a bundle ID. A new change management ticket, or a request for a new change management ticket, can be created if a search of the ticket tracking system does not identify a ticket. The ticket tracking system can be checked for a change management ticket by CIOS 202 using ticket tracking API 212. A request for a change management ticket can be provided via ticket tracking API 212. CIOS processor 204 can poll ticket tracking API 212 at regular intervals to determine if change management tickets have been added to the source control management service between polls. If a new change management ticket is identified, the CIOS processor 204 can check out at least one of the new change management tickets and update a local security impact list in CIOS memory 208. The security impact list can be a list of whether a security impact analysis has been performed for at least some bundle IDs.

At block 530, the source control management service can be checked. The source control management system can check for an authorization file for a given bundle ID. A new authorization file, or a request for an authorization file, can be generated if a check of the source control management service does not identify an authorization file. A check of the source control management service or a request for a new authorization file can be provided by CIOS 202 via source control management API 210. CIOS processor 204 can poll the source control management API 210 at regular intervals to determine if authorization files have been added to the source control management service between polls. If a new authorization file is identified, the CIOS processor 204 can check out at least one of the new authorization files and update a local permissions list in CIOS memory 208. The local permissions list can be a list of authorized networks for at least some bundle IDs.

At block 540, the deployment bundle can be provided to a restricted region. The deployment bundle can be provided to the restricted region via air gap service (AGS) 216. CIOS processor 204 can verify that the deployment bundle is authorized for deployment to the restricted region and that a security impact analysis has been performed for the deployment bundle's contents. Authorization can be verified based at least in part on an authorization file, and whether a security impact analysis has been performed can be verified based at least in part on a change management ticket. The deployment bundle can be retrieved from CIOS memory 208 and provided to the restricted region via AGS 216. The deployment bundle can be provided to the restricted region with at least one of the bundle ID, the change management ticket or the authorization file.

At block 550, the deployment bundle can be deployed to the restricted region. A high side operator can review at least one of the deployment bundle, the bundle ID, the change management ticket, or the authorization file to determine whether to deploy the deployment bundle. The high side operator may review the files provided to the restricted region by CIOS 202 on a high side computing device that can be connected to the restricted region. The high side operator can independently check the ticket tracking system and control management service using a low side computing device that may not be connected to the restricted region. The high side operator can retrieve at least one of deployment bundle, the bundle ID, the change management ticket, or the authorization file using the low side computing device. The high side operator may be a US citizen or green card holder who is accessing the high side device or low side device from US territory (e.g., IL5 approved person).

Figure 6:
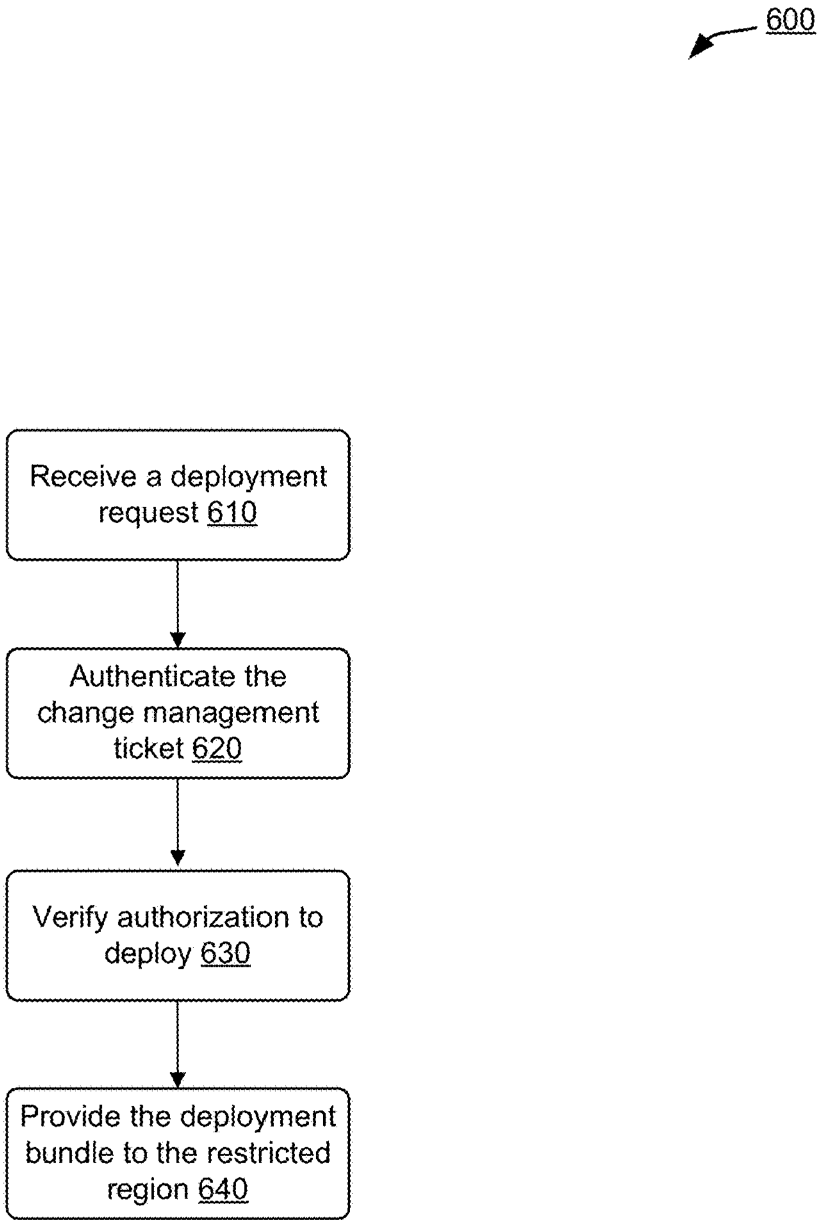
FIG. 6 shows a method for authorizing a deployment to a restricted network according to an embodiment.

FIG. 6 shows a method 600 for authorizing a deployment to a restricted network according to an embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 610, a deployment request can be received. The deployment request can be received by a computing device. For instance, the deployment request can be received by CIOS 202 via UI 206. The deployment request can be received from the ticket tracking system via ticket tracking API, or the request can be received from the source control management service via source control management API 212. The deployment request can be a request to provide a deployment bundle to a restricted network. The deployment request can include at least one of a deployment bundle, a target network (e.g., network identifier), a bundle ID, a change management ticket, or an authorization file. The deployment request can be stored in CIOS memory 208.

At block 620, the change management ticket can be authenticated. The change management ticket can be authenticated by CIOS 202 via ticket tracking API 212. CIOS 202 can retrieve the change management ticket from the ticket tracking system via ticket tracking API 212. The retrieved change management ticket can be stored in CIOS memory 208. CIOS processor 204 can compare the retrieved change management ticket to the deployment request. Authenticating the change management ticket can include verifying that at least one of the deployment bundle, the deployment request, or the change management ticket was made by an approved person. An approved person can be a united states citizen or green card holder on United States territory (e.g. IL5 approved person).

For example, CIOS processor 204 can compare the bundle ID from the change management ticket can to a bundle ID from the deployment request. CIOS processor 204 can check the change management ticket for an indication that a security impact analysis has been performed. For example, a flag in the change management ticket may indicate whether a security impact analysis has been performed. A request for a security impact analysis can be generated in response to a determination that a security impact analysis has been performed. The request for a security impact analysis can be provided to a user via UI 206.

At block 630, the authorization to deploy can be verified. CIOS 202 can retrieve an authorization file from the source control management service via source control management API 210. The retrieved authorization file can be stored in CIOS memory 208. The authorization file can identify a deployment bundle and a target network. The authorization file can be identified by a bundle ID. The authorization file can be verified by checking that the deployment bundle and the target network from the deployment request matches the deployment bundle and target network from the authorization file. The CIOS processor 204 can check that the authorization file and deployment request match by retrieving the file and request from CIOS memory 208.

At block 640, the deployment bundle can be provided to the restricted region. The deployment bundle can be provided in response to authenticating the change management ticket or verifying the authorization to deploy. CIOS processor 204 can retrieve the deployment bundle from CIOS memory 208. The retrieved deployment bundle can be provided to the restricted region via air gap service (AGS) 214. AGS 214 can provide the deployment bundle a unidirectional gateway that can allow traffic to enter the restricted region and prevents traffic from leaving the restricted region. The deployment bundle can be provided to the restricted region with the deployment request. A high side operator can verify the deployment request's contents and deploy the deployment bundle to the restricted network. The high side operator can access CIOS 202 via UI 206 to verify the deployment request's contents. The high side operator can access CIOS 202 via a low side computing device.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
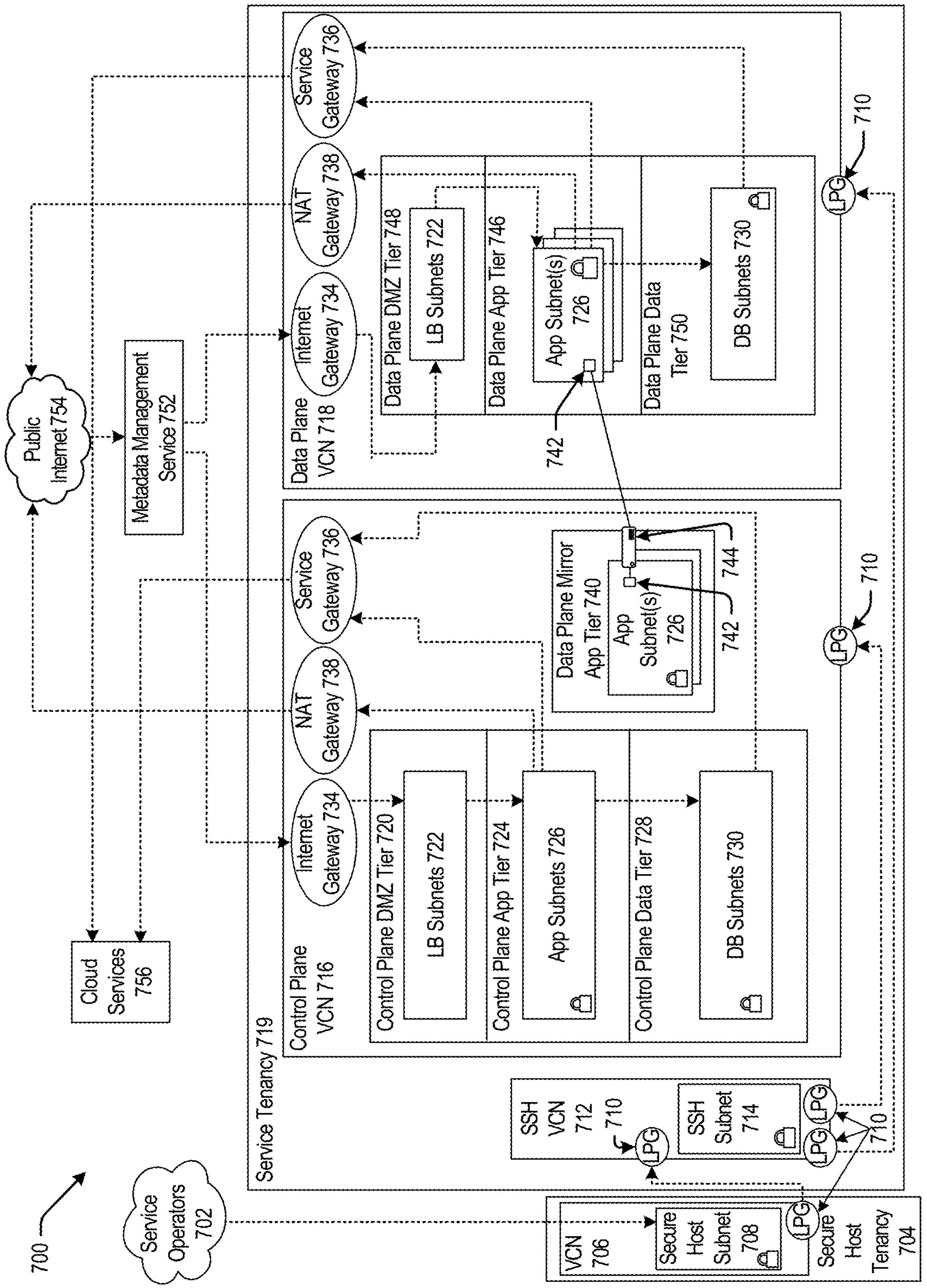
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
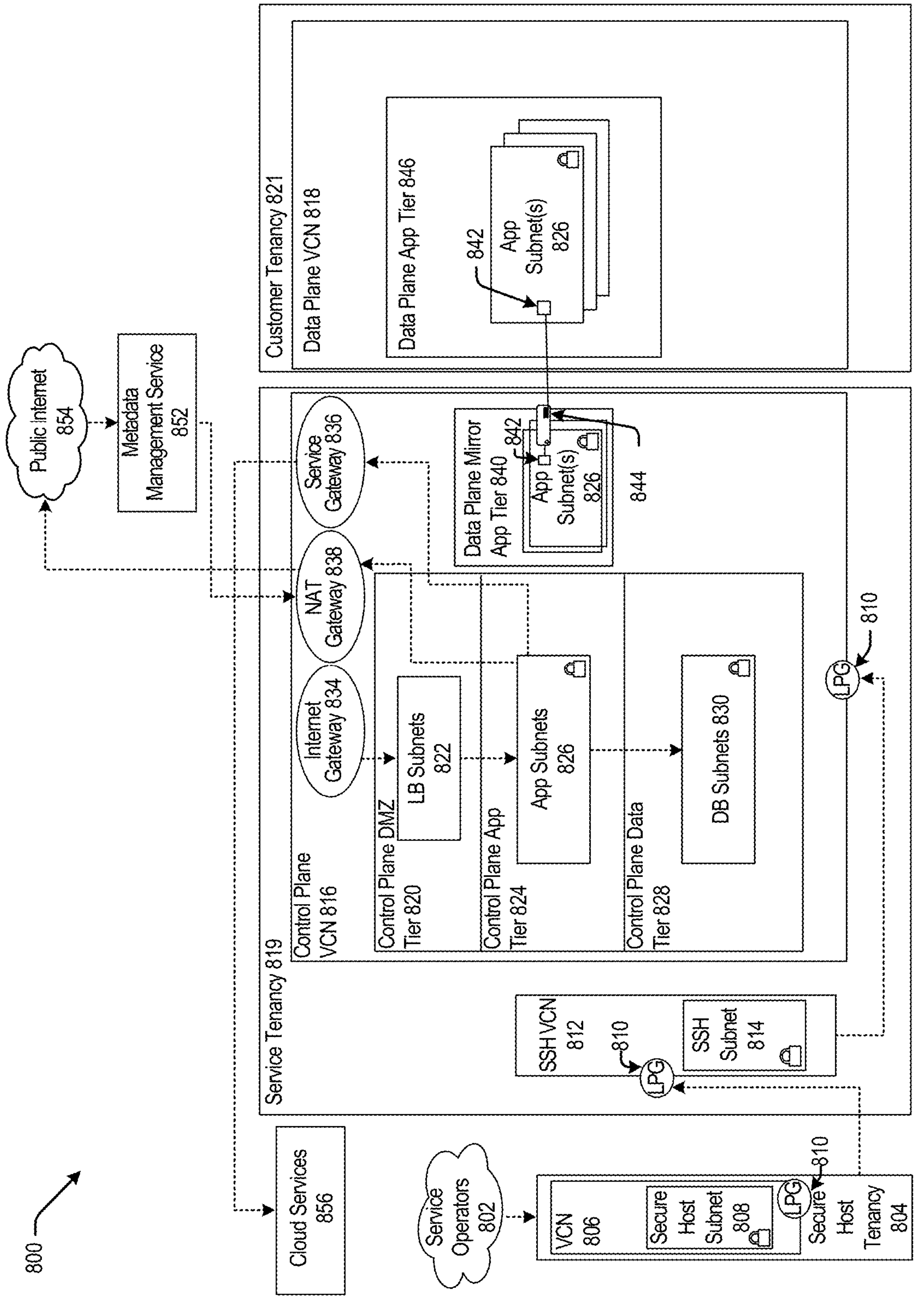
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
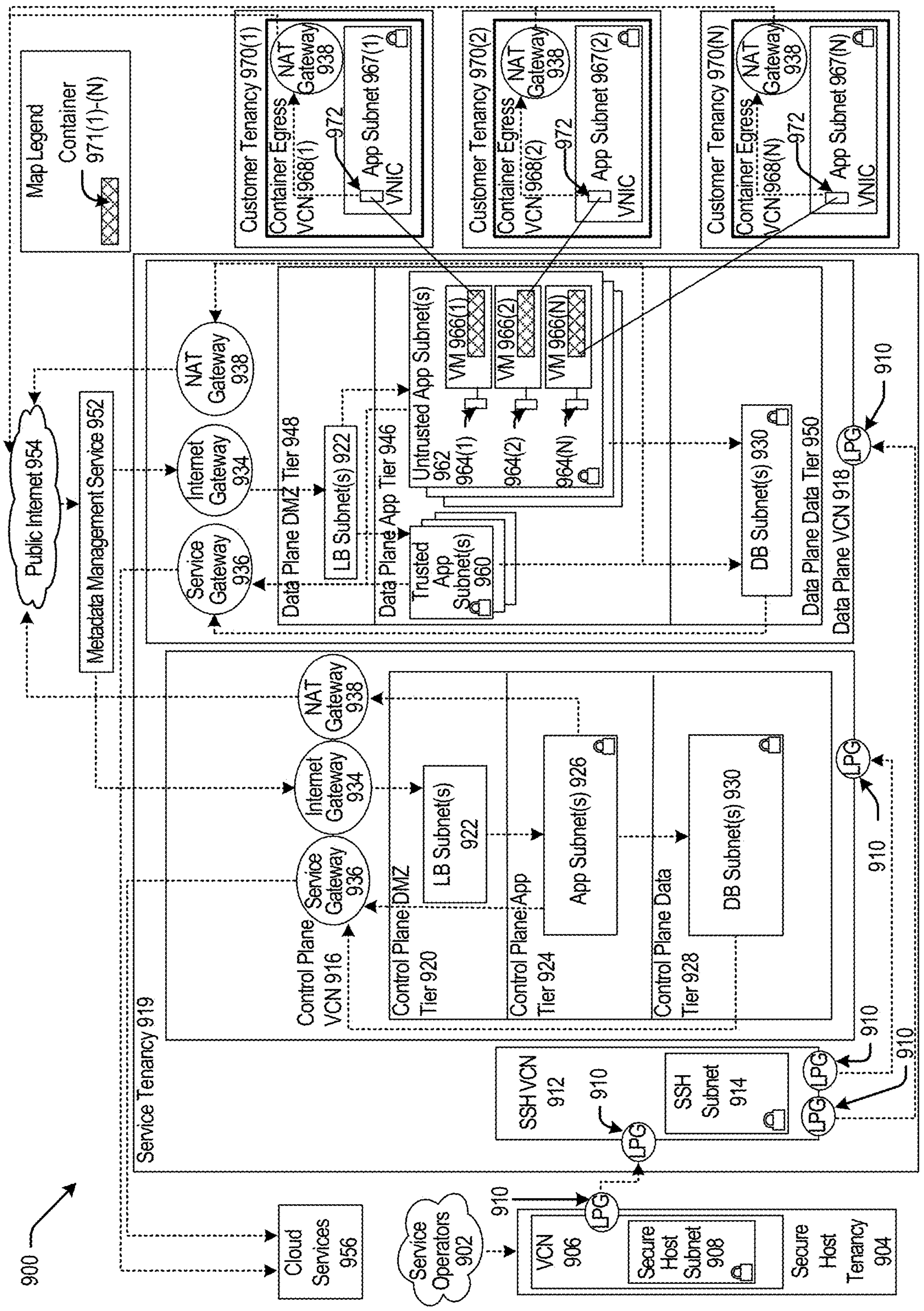
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
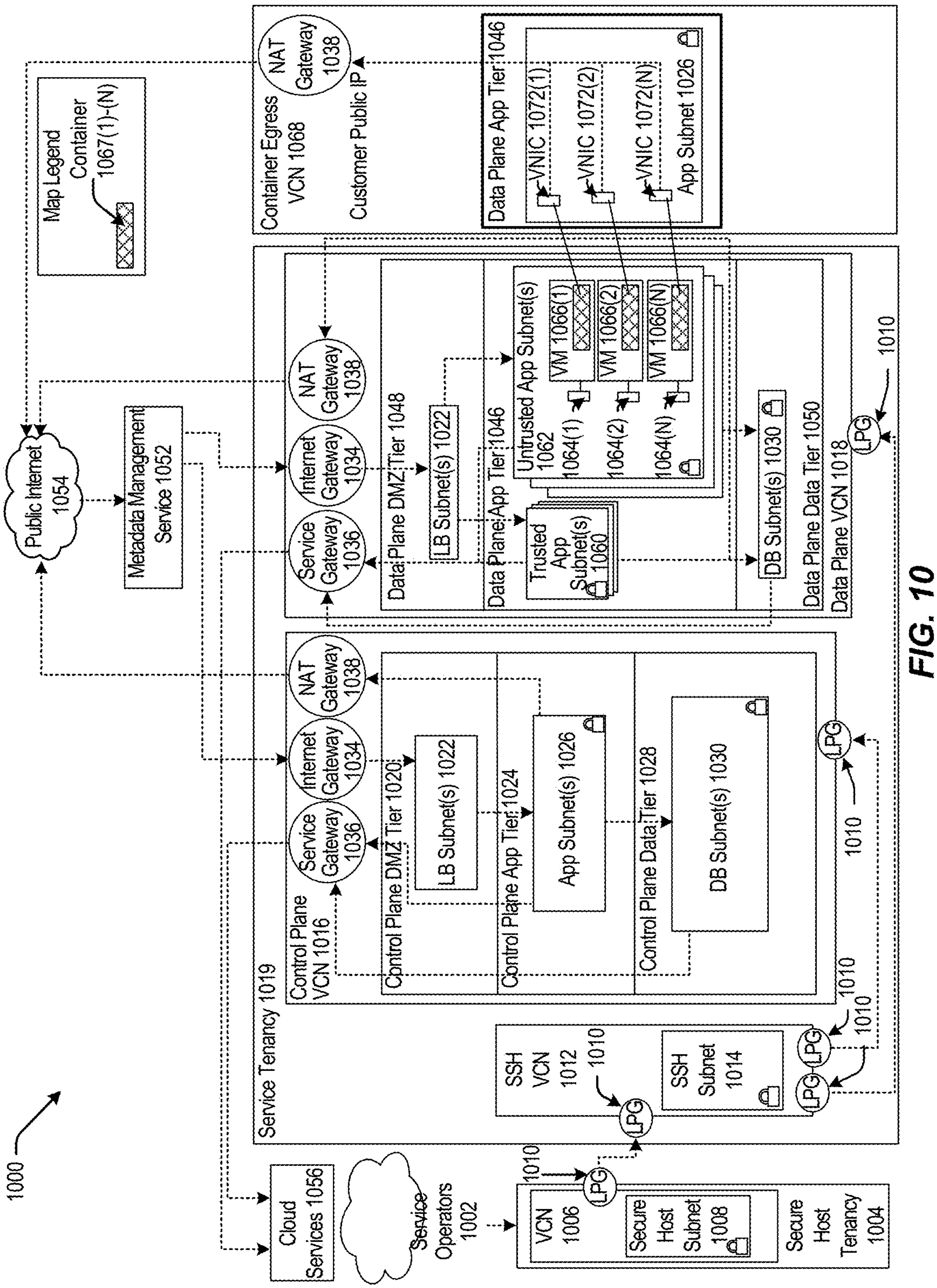
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
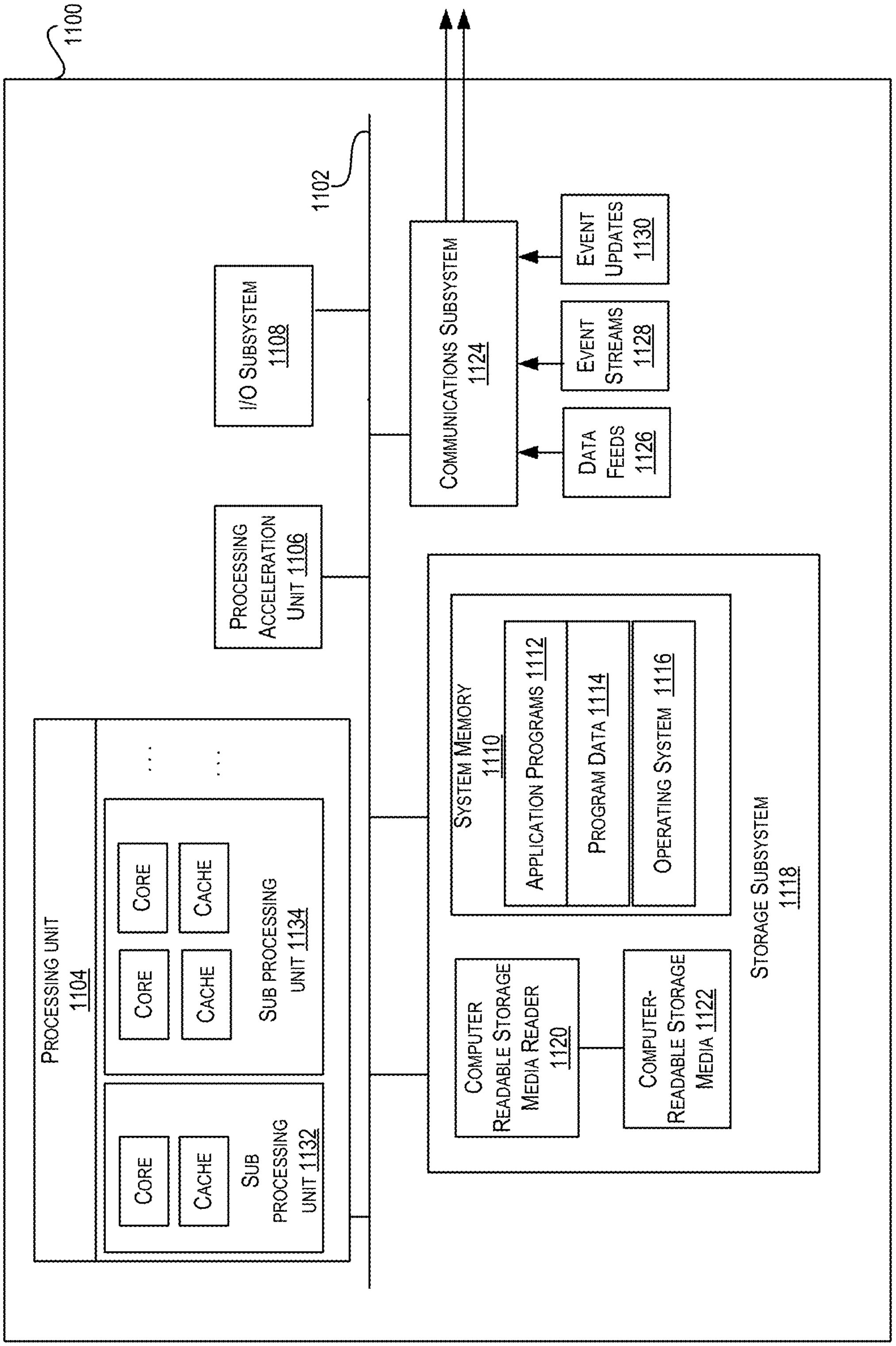
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:

receiving, by a computing device, a request to provide a deployment bundle to a restricted network, the deployment bundle including information that identifies a plurality of changes to be made to the restricted network, the request including at least one of a network identifier or a file identifier;

requesting, by the computing device, a change management ticket that corresponds to the deployment bundle from a ticket tracking system, the change management ticket indicating whether the plurality of changes are authorized;

receiving, by the computing device, information indicating that the change management ticket is not located in the ticket tracking system;

instructing, by the computing device, the ticket tracking system to generate the change management ticket;

authenticating, by the computing device, the change management ticket; and providing, by the computing device, the deployment bundle to a restricted region computing device configured to apply the deployment bundle to the restricted region.

2. The method of claim 1, wherein authenticating the change management ticket is based at least in part on determining if a security impact analysis for the plurality of changes has been performed.

3. The method of claim 2, further comprising:

creating, by the computing device, a security impact analysis request in response to a determination that the security impact analysis has not been performed for the plurality of changes.

4. The method of claim 1, wherein the deployment bundle is provided to the restricted network via a unidirectional gateway.

5. The method of claim 1, wherein the restricted network is configured to only receive traffic.

6. The method of claim 1, wherein authenticating the change management ticket includes creating a change management ticket in response to a determination that the change management ticket does not exist.

7. The method of claim 1, wherein authenticating the change management ticket includes determining whether the request was created by a user with department of defense (DoD) impact level 5 (IL5) authorization.

8. A non-transitory computer-readable medium storing a set of instructions that, when executed by one or more processors of a computing device, cause the computing device to perform operations comprising:

receiving a request to provide a deployment bundle to a restricted network, the deployment bundle including information that identifies a plurality of changes to be made to the restricted network, the request including at least one of a network identifier or a file identifier;

requesting a change management ticket that corresponds to the deployment bundle from a ticket tracking system, the change management ticket indicating whether the plurality of changes are authorized;

receiving information indicating that the change management ticket is not located in the ticket tracking system;

instructing the ticket tracking system to generate the change management ticket;

authenticating the change management ticket; and providing the deployment bundle to a restricted region computing device configured to apply the deployment bundle to the restricted region.

9. The non-transitory computer-readable medium of claim 8, wherein authenticating the change management ticket is based at least in part on determining if a security impact analysis for the plurality of changes has been performed.

10. The non-transitory computer-readable medium of claim 9, wherein the one or more instructions further cause the computing device to:

create a security impact analysis request in response to a determination that the security impact analysis has not been performed for the plurality of changes.

11. The non-transitory computer-readable medium of claim 8, wherein the deployment bundle is provided to the restricted network via a unidirectional gateway.

12. The non-transitory computer-readable medium of claim 8, wherein the restricted network is configured to only receive traffic.

13. The non-transitory computer-readable medium of claim 8, wherein the one or more instructions, that cause the computing device to authenticate the change management ticket, cause the computing device to create a change management ticket in response to a determination that the change management ticket does not exist.

14. The non-transitory computer-readable medium of claim 8, wherein the one or more instructions, that cause the computing device to authenticate the change management ticket, cause the computing device to determine whether the request was created by a user with department of defense (DoD) impact level 5 (IL5) authorization.

15. A computing device, comprising:

one or more memories; and one or more processors, communicatively coupled to the one or more memories, configured to:

receive a request to provide a deployment bundle to a restricted network, the deployment bundle including information that identifies a plurality of changes to be made to the restricted network, the request including at least one of a network identifier or a file identifier;

request a change management ticket that a ticket tracking system to authenticate the change management ticket, the change management ticket indicating whether the plurality of changes are authorized;

access a source control management service to determine, based at least in part on the network identifier or the file identifier, if the deployment bundle is authorized to access the restricted network; and provide the deployment bundle to a restricted region computing device configured to apply the deployment bundle to the restricted region.

16. The computing device of claim 15, wherein authenticating the change management ticket is based at least in part on determining if a security impact analysis for the plurality of changes has been performed.

17. The computing device of claim 16, wherein the one or more processors are further configured to:

create a security impact analysis request in response to a determination that the security impact analysis has not been performed for the plurality of changes.

18. The computing device of claim 15, wherein the deployment bundle is provided to the restricted network via a unidirectional gateway.

19. The computing device of claim 15, wherein the one or more processors, when authenticating the change management ticket, are configured to create a change management ticket in response to a determination that the change management ticket does not exist.

20. The computing device of claim 15, wherein the one or more processors, when authenticating the change management ticket, are configured to determine whether the request was created by a user with department of defense (DoD) impact level 5 (IL5) authorization.

* * * * *